US010046275B2

(12) United States Patent
Nilsson et al.

(10) Patent No.: US 10,046,275 B2
(45) Date of Patent: Aug. 14, 2018

(54) SYSTEM AND METHOD FOR IMPROVING THE PERFORMANCE OF A SELECTIVE CATALYST REDUCTION SYSTEM IN A HEAT RECOVERY STEAM GENERATOR

(71) Applicant: GENERAL ELECTRIC TECHNOLOGY GMBH, Baden (CH)

(72) Inventors: John Martin Nilsson, Wettingen (CH); Stefano Bernero, Oberrohrdorf (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/067,288

(22) Filed: Mar. 11, 2016

(65) Prior Publication Data
US 2017/0259209 A1    Sep. 14, 2017

(51) Int. Cl.
*B01D 53/92* (2006.01)
*F01K 23/10* (2006.01)
*B01D 53/83* (2006.01)
*B01D 53/50* (2006.01)
*B01D 53/34* (2006.01)

(52) U.S. Cl.
CPC ........... *B01D 53/92* (2013.01); *B01D 53/343* (2013.01); *B01D 53/508* (2013.01); *B01D 53/83* (2013.01); *F01K 23/10* (2013.01); *B01D 2251/602* (2013.01); *B01D 2251/604* (2013.01); *B01D 2251/606* (2013.01); *B01D 2252/102* (2013.01); *B01D 2258/01* (2013.01)

(58) Field of Classification Search
None
See application file for complete search history.

(56) References Cited

U.S. PATENT DOCUMENTS

| 5,540,897 | A | * | 7/1996 | Chu | ................... | B01D 53/8637 |
| | | | | | | 422/171 |
| 5,660,799 | A | | 8/1997 | Motai et al. | | |
| 5,672,323 | A | * | 9/1997 | Bhat | ..................... | B01D 53/02 |
| | | | | | | 422/172 |
| 5,840,263 | A | * | 11/1998 | Shinoda | .............. | B01D 53/504 |
| | | | | | | 422/169 |
| 5,875,722 | A | | 3/1999 | Gosselin, Jr. et al. | | |

(Continued)

FOREIGN PATENT DOCUMENTS

| DE | 43 35 136 A1 | 4/1994 |
| EP | 1 441 109 A1 | 7/2004 |
| WO | 2013/143347 A2 | 10/2013 |

OTHER PUBLICATIONS

Extended European Search Report and Opinion issued in connection with corresponding EP Application No. 17159672.9 dated Sep. 27, 2017.

*Primary Examiner* — Sheng Han Davis
(74) *Attorney, Agent, or Firm* — GE Global Patent Operation; Stephen G. Midgley

(57) ABSTRACT

A heat recovery steam generator includes a gas inlet for receiving a flow of exhaust gas from a gas turbine, a gas outlet opposite the gas inlet and configured to transport the flow of exhaust gas to atmosphere, and a sorbent injection device intermediate the gas inlet and the gas outlet, the sorbent injection device including at least one injection port configured to inject a sorbent into the flow of exhaust gas. The sorbent is configured to react with an acid gas within the flow of exhaust gas to neutralize the acid gas and inhibit the formation of salt deposits.

19 Claims, 3 Drawing Sheets

(56) References Cited

U.S. PATENT DOCUMENTS

| | | | |
|---|---|---|---|
| 2008/0141646 A1* | 6/2008 | Yoshida | F01K 23/068 60/39.12 |
| 2009/0282803 A1* | 11/2009 | Bono | B01D 53/343 60/39.5 |
| 2012/0102913 A1* | 5/2012 | Emani | F01K 17/02 60/39.182 |
| 2013/0031910 A1 | 2/2013 | Merchant et al. | |
| 2013/0089482 A1 | 4/2013 | Latimer et al. | |
| 2013/0104519 A1 | 5/2013 | Zhang et al. | |
| 2013/0139683 A1* | 6/2013 | Hanson | B01D 53/08 95/1 |
| 2015/0004082 A1* | 1/2015 | Singh | B01D 53/62 423/210 |

* cited by examiner

SYSTEM AND METHOD FOR IMPROVING THE PERFORMANCE OF A SELECTIVE CATALYST REDUCTION SYSTEM IN A HEAT RECOVERY STEAM GENERATOR

BACKGROUND

Technical Field

Embodiments of the invention relate generally to power generation systems and, more particularly, to a system and method for improving the performance of a selective catalyst reduction system in a heat recovery steam generator.

Discussion of Art

Gas turbines have been widely used to provide electric power, usually as a standby for both peak power and reserve power requirements in the utility industry. Gas turbines are preferred because of their rapid starting capability and low capital cost. Conventional gas turbines, however, operate with reduced thermal efficiency due to the high exit temperatures of the exhaust gas stream and the resulting thermal loss. Therefore, a gas turbine is often combined with a heat recovery steam generator to improve overall system efficiency.

As is known in the art, a heat recovery steam generator generates steam utilizing the energy in the exhaust from the gas turbine. In a cogeneration mode, steam produced from the heat recovery steam generator can be used for process applications, whereas in a combined-cycle mode, power may generated via a steam turbine generator.

All combustion processes utilizing fossil fuels have the potential for producing emissions such as nitrogen oxides ($NO_x$) and carbon monoxide. This also applies to the combustion process in a gas turbine where there are high temperatures and high excess air levels. Accordingly, the exit gas from the gas turbine which flows into and through the heat recovery steam generator contains a significant quantity of $NO_x$ and carbon monoxide. Stringent environmental regulations for carbon monoxide and nitrogen oxides have led to the development of selective catalyst reduction (SCR) systems that have been integrated into heat recovery steam generators. SCR systems function to remove nitrogen oxides, for example, through a selective catalytic reduction process. Typically, ammonia is injected into the flue or exhaust gas passing through the heat recovery steam generator, which is then absorbed onto a catalyst, to convert the nitrogen oxides into nitrogen and water. The treated exhaust gas may then be exhausted to atmosphere.

While existing SCR systems are generally effective in reducing emissions levels to comply with stringent standards, they can contribute to the formation of deposits on heat transfer surfaces within the heat recovery steam generator. These deposits are a common cause of reduced steam production, low steam temperatures, and degraded gas turbine performance, which may contribute to reduced electricity production and lost revenue. In particular, over time, fouling can bridge the gap between adjacent tube fins or other heat-transfer surfaces, further disrupting heat transfer and increasing gas-side pressure drop. In cases where heat recovery steam generator performance is severely compromised, the entire plant may require an extended forced outage to remove deposits from heat-transfer surfaces, or even replace an entire boiler module.

In view of the above, there is a need for a system and method for improving the performance of a selective catalyst reduction system in a heat recovery steam generator. In particular, there is a need for a system and method of inhibiting the formation of salt deposits on heat transfer surfaces of a heat recovery steam generator in order to increase overall system efficiency.

BRIEF DESCRIPTION

In an embodiment, a heat recovery steam generator is provided. The heat recovery steam generator includes a gas inlet for receiving a flow of exhaust gas from a gas turbine, a gas outlet opposite the gas inlet and configured to transport the flow of exhaust gas to atmosphere, and a sorbent injection device intermediate the gas inlet and the gas outlet, the sorbent injection device including at least one injection port configured to inject a sorbent into the flow of exhaust gas. The sorbent is configured to react with an acid gas within the flow of exhaust gas to neutralize the acid gas and inhibit the formation of salt deposits.

In another embodiment, a method of inhibiting the formation of salt deposits in a heat recovery steam generator is provided. The method includes the steps of receiving a flow of exhaust gas from a gas turbine and injecting a sorbent into the flow of exhaust gas. The sorbent is configured to react with sulfur oxides within the exhaust gas to neutralize the sulfur oxides and inhibit the formation of the salt deposits.

In yet another embodiment, a sorbent injection device for a heat recovery steam generator is provided. The sorbent injection device includes a hopper configured to hold a quantity of dry sorbent and a plurality of injection ports defining an injection grid, the injection ports being in fluid communication with the hopper. The sorbent injection device is configured to inject a sorbent into a flow of exhaust gas upstream from an ammonia injection grid of the heat recovery steam generator. The sorbent is configured to react with an acid gas within the flow of exhaust gas to neutralize the acid gas and inhibit the formation of salt deposits.

DRAWINGS

The present invention will be better understood from reading the following description of non-limiting embodiments, with reference to the attached drawings, wherein below:

DETAILED DESCRIPTION

Figure 1:
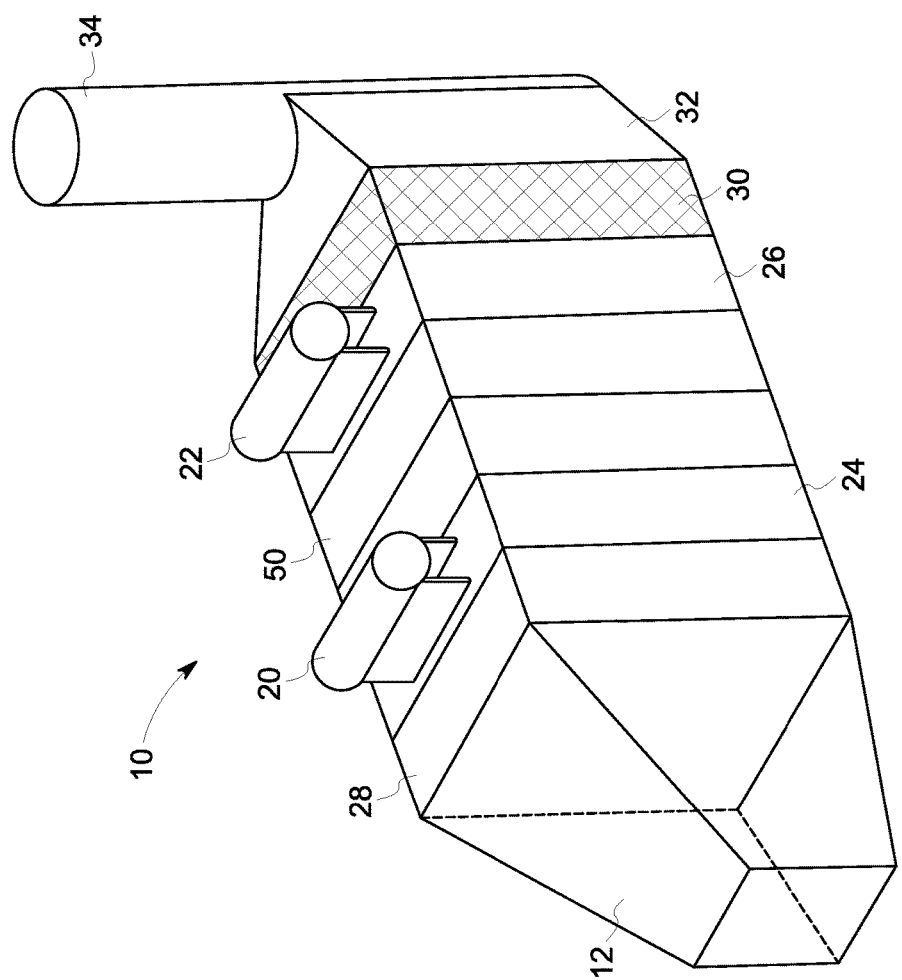
FIG. 1 is a schematic illustration of a heat recovery steam generator according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in a heat recovery steam generator of a combined cycle or cogeneration power plant employing gas turbines, embodiments of the invention may also be applicable for use in other gas turbine applications where sulfur oxides or other acidic gases are desired to be removed from flue gas exiting the gas turbines.

As used herein, "upstream" and "downstream" refer to the flow direction of an exhaust gas from the gas turbine (i.e., exhaust gas flows from an upstream end of the heat recovery steam generator to a downstream end of the heat recovery steam generator). As used herein, "gas turbine" means a turbine driven by expanding hot gases produced by burning non-coal fuel such as, for example, petrol, natural gas, propane, diesel, kerosene, E85, biodiesel and biogas. As used herein, "fluidly coupled" or "fluid communication" refers to an arrangement of two or more features such that the features are connected in such a way as to permit the flow of fluid between the features and permits fluid transfer.

Figure 2:
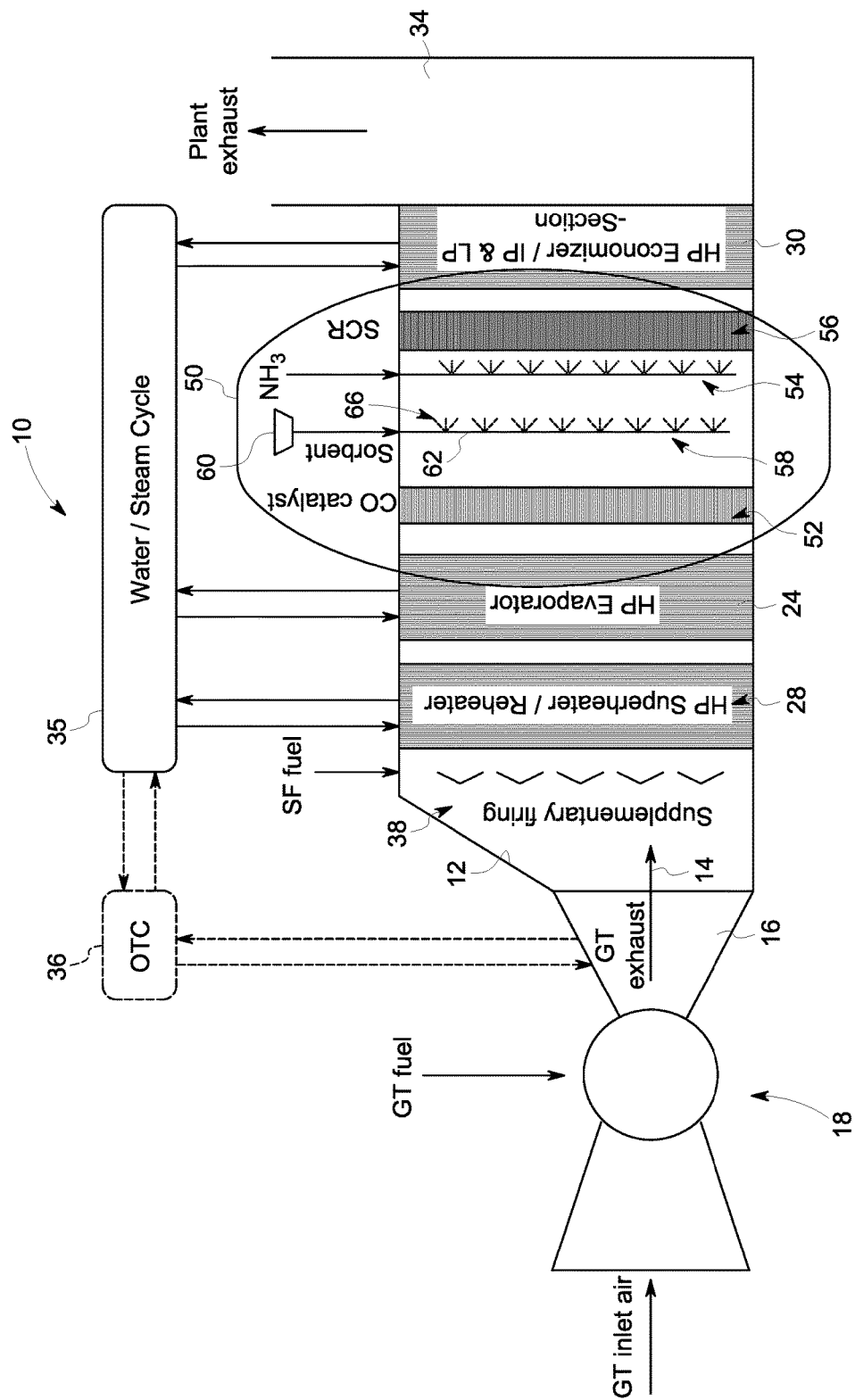
FIG. 2 is another schematic illustration of the heat recovery steam generator of FIG. 1, showing a dry sorbent injection device according to an embodiment of the present invention.

Embodiments of the invention relate to a system and method for improving the performance of the selectively catalyst reduction system in a heat recovery steam generator. FIGS. 1 and 2 illustrates an exemplary heat recovery steam generator ("HRSG") 10 in which the system of the invention may be deployed. The HRSG 10 has an inlet plenum 12 which is supplied with combustion/exhaust gas 14 from an exhaust duct 16 of a gas turbine 18 which powers a generator (not shown). HRSG 10 may be of any known design and includes, for example, a high pressure drum 20, a low pressure drum 22, and associated heat exchanger surfaces including high and low pressure evaporators 24, 26, respectively, superheater 28, and economizer 30 surfaces in a conventional manner. After passing through the heat exchangers, the exhaust gases are directed through a transition piece 32 and are emitted to atmosphere via stack 34, as is known in the art. While the HRSG 10 is illustrated as a dual pressure HRSG having high pressure and low pressure sections, the invention is equally applicable to HRSGs having any number of pressure sections including, for example, a triple pressure HRSG having three pressure sections (i.e. a high pressure section, a low pressure section and an intermediate pressure section).

Each pressure section of the HRSG 10 is configured to transfer energy from the exhaust gas passing therethrough to a feedwater supply to make superheated steam to drive a steam turbine. More specifically, the evaporators or boiler sections (e.g., evaporators 24, 26) function to vaporize water and produce steam. The evaporators may include a bank of finned tubes which extend into the exhaust path from steam drums located at the top of the HRSG 10. Boiler feedwater is supplied to the steam drum(s) at an appropriate pressure, and circulates through the finned tubes of the evaporator. The circulating water absorbs heat from the gas turbine exhaust 14. The amount of heat absorbed by the water, and the amount of heat released by the exhaust gas to generate steam is a product of the mass flow rate of the exhaust gas, the average gas specific heat capacity, the temperature difference across the evaporator, and the surface are of the finned tubes.

The economizers (e.g., economizer 30) are typically installed downstream of the evaporators with which they are associated and function to further lower the temperature of the exhaust gas. Economizers are, similar to the evaporators, finned-tube gas-to-water heat exchangers and, in addition to lowering the temperature of exhaust gas, function to preheat the feedwater prior to its entry into the steam drums associated with the evaporators.

The superheater 28 is located upstream of the associated evaporator and functions to add sensible heat to dry steam produced by the evaporator and steam drum, superheating it beyond the saturation temperature for use by the steam turbine. In an embodiment, the superheater may include either a single heat exchanger module or multiple heat exchanger modules.

As illustrated in FIG. 2, the circulation of water through the HRSG 10 to produce steam defines a water/steam cycle 35. In particular, as exhaust gas 14 passes through the HRSG 10 from gas turbine 18 (i.e., the upstream end) to the stack 34 (i.e., the downstream end), feedwater is circulated through the economizers, evaporators (and steam drums associated therewith) and superheaters in a generally reverse direction, from the stack end of the HRSG to the gas turbine end of the HRSG. As the upstream end of the HRSG is at a higher temperature than the downstream end, the feedwater increases in temperature as it travels from the downstream end to the upstream end, generating steam along the way in the water/steam cycle 35 for subsequent use, such as in a steam turbine.

As also shown therein, the HRSG 10 may include a once-through cooling system 36 that is configured to cool the air around the turbine blades in the first expansion stage of the gas turbine 18, in order to raise the temperature of the exhaust gas. Moreover, in an embodiment, the HRSG 10 may include a supplementary firing section 38 for further increasing the temperature of the exhaust gas 14 prior to entering the high pressure section of the HRSG 10.

With further reference to FIG. 2, the HRSG 10 includes a selective catalyst reduction system 50 that is configured to remove nitrogen oxides and carbon monoxide from the exhaust gas 14 before it exits the HRSG 10 through the stack 34. As best shown in FIG. 2, the SCR system 50 is located just upstream from the intermediate and low pressure sections of the HRSG 10 (i.e., between the evaporator of the high pressure section and the evaporator(s) of the intermediate and/or low pressure sections). In an embodiment, the SCR system 50 is located just upstream from the economizer 30.

In addition to the SCR system, 50 a first catalytic reactor 52 is provided that is configured to oxidize carbon monoxide in the exhaust gas 14, to produce carbon dioxide ($CO_2$). The SCR system 50 also includes an ammonia injection grid 54 downstream from the CO catalyst 52, which is configured to distribute vaporized ammonia ($NH_3$) into the flow of exhaust gas 14. The ammonia vapor mixes with the exhaust gas 14. This mixture then travels through a second catalytic reactor 56 where nitrogen oxides in the exhaust gas are converted into nitrogen and water. The SCR system 50 and the catalytic reactor 52, therefore, function to reduce both carbon dioxide and nitrogen oxide emissions.

In the first catalytic reactor 52, however, the oxidation catalyst used to convert the carbon monoxide into carbon dioxide may also increase the conversion of sulfur dioxide ($SO_2$) in the exhaust gas to sulfur trioxide ($SO_3$), which can react with excess ammonia from the ammonia injection grid 54 to form ammonium sulfate, which can collect on cold sections of the HRSG 10 downstream from the SCR system 50. In particular, these ammonium sulfate salt deposits may build up on the finned tubes of any of the HRSG components downstream from the SCR system 50, including on the finned tubes of the economizer 30. The formation of these salt deposits, as discussed above, may result in a loss of gas turbine efficiency, loss in combined cycle efficiency, elevated stack temperatures and reduced catalyst lifetime.

In order to address this issue, the HRSG 10 also includes a dry sorbent injection device 58 that may form a part of the SCR system 50. In the embodiment shown in FIG. 2, the dry sorbent injection device 58 is located just upstream from the ammonia injection grid 54, between the ammonia injection grid 54 and the carbon monoxide catalytic reactor 52. In an embodiment, the dry sorbent injection device 58 includes a feeder or hopper 60 and an injection grid 62. A dry sorbent 66 is transported by the feeder 60 to the injection grid 62, where it is injected into the flow of exhaust gas 14. In an embodiment, the sorbent may be transported using a pneumatic conveying system. In other embodiments, the sorbent injection device 58 may be separate from the SCR system 50.

Figure 3:
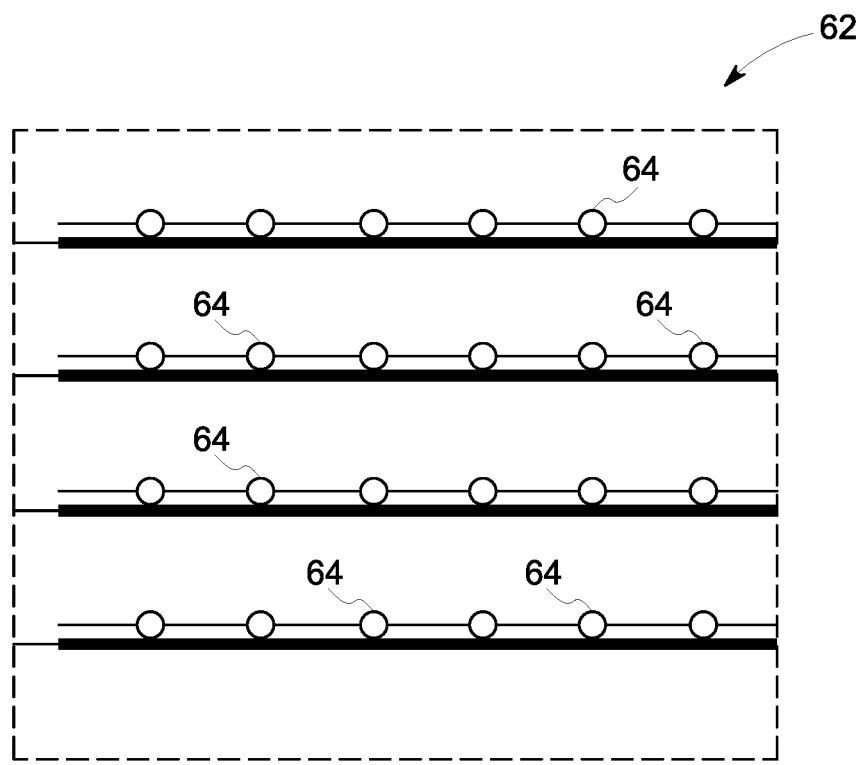
FIG. 3 is a schematic illustration of a dry sorbent injection grid of the sorbent injection device.

As illustrated in FIG. 3, the injection grid 62 includes a plurality of injection points 54 (e.g., apertures or ports) arranged in stacked rows, through which the sorbent may be injected into the flow of exhaust gas 14. In an embodiment, the grid 62 is arranged such that the sorbent is injected into the exhaust gas 14 in a direction substantially parallel to the flow of exhaust gas. In other embodiments, the grid 62 may be arranged such that the sorbent is injected to the exhaust gas 14 in a direction substantially perpendicular to the flow of exhaust gas. In yet other embodiments, the sorbent may be injected using a single point injection system. In any of these embodiments, air may be utilized to assist with injection and dispersion of the sorbent 66 into the exhaust gas flow.

Once injected, the sorbent reacts with the acid gases in the exhaust gas 14 of the gas turbine, namely, the sulfur dioxide ($SO_2$) and sulfur trioxide ($SO_3$), neutralizing such gases and thus inhibiting or preventing the formation of ammonium sulfate salt deposits. As the formation of these deposits is inhibited, the buildup of such deposits on the colder, downstream sections of the HRSG 10 can be reduced, thereby increasing the efficiency of the HRSG 10 and combined cycle system, as a whole. As used herein, "acid gas" means sulfur oxides within the stream of exhaust gas.

In an embodiment, the sorbent may be an alkaline sorbent such as, for example, trona ($Na_3(CO_3)(HCO_3).2H_2O$), hydrated lime ($Ca(OH)_2$), sodium bicarbonate ($NaHCO_3$) or magnesium oxide (MgO). In an embodiment, the trona has a particle size between about 10 μm to about 35 μm. Where hydrated lime is utilized, the hydrated lime has a particle size between about 2 μm to about 4 μm. Where sodium bicarbonate is utilized, the sodium bicarbonate has a particle size between about 10 μm to about 20 μm. Where magnesium oxide is utilized, the magnesium oxide has a particle size between about 0.5 μm to about 2 μm.

In an embodiment, the normal flue gas/exhaust gas velocity at the exit of the boiler (e.g., the evaporator 28) is on the order of 2-6 m/s, depending on load conditions and temperatures. Injecting dry sorbents having a particle size within the ranges indicated above into a flue gas stream having a velocity within the range of 2-6 m/s will prevent the sorbent from settling within the HRSG 10.

As discussed above, the injection of a dry sorbent into the exhaust gas of the gas turbine mitigates acid gases, thereby inhibiting the formation of salt deposits. In particular, neutralizing the acid gases within the exhaust gas before such gases can react with ammonia from the ammonia injection grid prevents the formation of salt deposits which can collect on downstream heat transfer surfaces such as the finned tubes of the economizer and other components of the low and intermediate pressure sections of the HRSG. Thus, corrosion, ammonium bisulfate (ABS) and ammonium sulfate (AS) deposits on the heat transfer surfaces of the HRSG 10 may be mitigated. This ensures that optimal heat transfer from the exhaust gas to the feedwater within the boiler tubes of the economizer can take place, maximizing steam generation.

While the dry sorbent injection device 58 has been described herein as inhibiting the formation of salt deposits on the heat transfer surfaces of the economizer 30 (i.e. on the finned-tubes of the economizer), the present invention is not so limited in this regard. In particular, the dry sorbent injection device is operable to inhibit corrosion and the formation of ABS and AS salt deposits on all components and surfaces of the HRSG 10 downstream from the ammonia injection grid 54 and/or the dry sorbent injection device 58. In connection with the above, in certain embodiments, the device 58 may be positioned anywhere within the HRSG 10 along the exhaust flow path and upstream from the ammonia injection grid 54. In an embodiment, the dry sorbent injection device 58 is located downstream from the last combustion section of the HRSG 10 (e.g., the gas turbine 18 or the supplementary firing section 38 of the HRSG 10) and upstream from the ammonia injection grid 54. For example, the dry sorbent injection device 58 may be positioned adjacent to the exhaust duct 16 of the gas turbine 18 or immediately downstream from the supplementary firing section 38 of the HRSG 10.

In an embodiment, a heat recovery steam generator is provided. The heat recovery steam generator includes a gas inlet for receiving a flow of exhaust gas from a gas turbine, a gas outlet opposite the gas inlet and configured to transport the flow of exhaust gas to atmosphere, and a sorbent injection device intermediate the gas inlet and the gas outlet, the sorbent injection device including at least one injection port configured to inject a sorbent into the flow of exhaust gas. The sorbent is configured to react with an acid gas within the flow of exhaust gas to neutralize the acid gas and inhibit the formation of salt deposits. In an embodiment, the at least one injection port is a plurality of injection ports defining an injection grid. In an embodiment, the injection grid is configured to inject the sorbent into the flow of exhaust gas in a direction generally parallel to the flow of exhaust gas. In an embodiment, the injection grid is configured to inject the sorbent into the flow of exhaust gas in a direction generally perpendicular to the flow of exhaust gas. In an embodiment, the sorbent is an alkaline sorbent. In an embodiment, the acid gas includes sulfur oxides and the sorbent is one of trona having a particle size between approximately 10 μm and 35 μm, hydrated lime having a particle size between approximately 2 μm and 4 μm, sodium bicarbonate having a particle size between approximately 10 μm and 20 μm, and magnesium oxide having a particle size between approximately 0.5 μm and 2 μm. In an embodiment, the salt deposits include at least one of ammonium sulfate and ammonium bisulfate. In an embodiment, the heat recovery steam generator includes an ammonia injection grid located downstream from the sorbent injection device, the ammonia injection grid being configured to inject ammonia into the flow of exhaust gas. In an embodiment, a flow velocity of the exhaust gas at the sorbent injection device is between approximately 2 m/s and 6 m/s.

In another embodiment, a method of inhibiting the formation of salt deposits in a heat recovery steam generator is provided. The method includes the steps of receiving a flow of exhaust gas from a gas turbine and injecting a sorbent into the flow of exhaust gas within the heat recovery steam generator. The sorbent is configured to react with sulfur oxides within the exhaust gas to neutralize the sulfur oxides and inhibit the formation of the salt deposits. In an embodiment, the sorbent is trona having a particle size between approximately 10 μm and 35 μm. In an embodiment, the sorbent is hydrated lime having a particle size between approximately 2 μm and 4 μm. In an embodiment, the sorbent is sodium bicarbonate having a particle size between approximately 10 μm and 20 μm. In an embodiment, the sorbent is magnesium oxide having a particle size between approximately 0.5 μm and 2 μm. In an embodiment, the sorbent is injected in a direction generally parallel to a flow direction of the exhaust gas. In other embodiments, the sorbent may be injected in a direction generally perpendicular to a flow direction of the exhaust gas. In an embodiment, the sorbent is injected into the flow of exhaust gas upstream from an ammonia injection point where ammonia is injected into the flow of exhaust gas. In an embodiment, the sorbent is injected into the flow of exhaust gas upstream from an economizer of the heat recovery steam generator and downstream from an evaporator of the heat recovery steam generator.

In yet another embodiment, a sorbent injection device for a heat recovery steam generator is provided. The sorbent injection device includes a hopper configured to hold a quantity of dry sorbent and a plurality of injection ports defining an injection grid, the injection ports being in fluid communication with the hopper. The sorbent injection device is configured to inject a sorbent into a flow of exhaust gas upstream from an ammonia injection grid of the heat recovery steam generator. The sorbent is configured to react with an acid gas within the flow of exhaust gas to neutralize the acid gas and inhibit the formation of salt deposits. In an embodiment, the injection grid is configured to inject the sorbent into the flow of exhaust gas in a direction generally parallel to the flow of exhaust gas, the dry sorbent includes at least one of trona, hydrated lime, sodium bicarbonate and magnesium oxide, and the dry sorbent is configured to react with the sulfur oxides within the exhaust gas to neutralize the sulfur oxides and inhibit the formation of the salt deposits.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method, and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A heat recovery steam generator for recovering thermal energy from a flow of exhaust gas of a gas turbine, the heat recover steam generator comprising:
    a gas inlet for receiving the flow of exhaust gas;
    a gas outlet downstream of the gas inlet;
    an economizer and an evaporator intermediate the gas inlet and the gas outlet; and
    an injection device intermediate the economizer and the evaporator, the injection device including at least one injection port configured to inject a sorbent into the flow of exhaust gas;
    wherein the sorbent is configured to react with an acid gas within the flow of exhaust gas to neutralize the acid gas and inhibit the formation of salt deposits.

2. The heat recovery steam generator of claim 1, wherein:
    the at least one injection port is a plurality of injection ports defining a sorbent injection grid.

3. The heat recovery steam generator of claim 2, wherein:
    the sorbent injection grid is configured to inject the sorbent into the flow of exhaust gas in a direction generally parallel to the flow of exhaust gas.

4. The heat recovery steam generator of claim 2, wherein:
    the sorbent injection grid is configured to inject the sorbent into the flow of exhaust gas in a direction generally perpendicular to the flow of exhaust gas.

5. The heat recovery steam generator of claim 1, wherein:
    the sorbent is a solid sorbent.

6. The heat recovery steam generator of claim 1, wherein:
    the acid gas includes sulfur oxides; and
    the sorbent is one of trona having a particle size between approximately 10 µm and 35 µm, hydrated lime having a particle size between approximately 2 µm and 4 µm, sodium bicarbonate having a particle size between approximately 10 µm and 20 µm, and magnesium oxide having a particle size between approximately 0.5 µm and 2 µm.

7. The heat recovery steam generator of claim 2, further comprising:
    a first catalyst upstream of the sorbent injection grid to convert carbon monoxide (CO) to carbon dioxide ($CO_2$).

8. The heat recovery steam generator of claim 7, further comprising:

an ammonia injection grid downstream from the sorbent injection grid, the ammonia injection grid being configured to inject ammonia into the flow of exhaust gas; and a second catalyst downstream of the ammonia injection grid to convert nitrogen oxides into nitrogen and water.

9. The heat recovery steam generator of claim 6, wherein:
a flow velocity of the exhaust gas at the sorbent injection device is between approximately 2 m/s and 6 m/s.

10. A heat recovery steam generator for recovering thermal energy from a flow of exhaust gas of a gas turbine, the heat recovery steam generator comprising:
a gas inlet for receiving the flow of exhaust gas;
a gas outlet downstream of the gas inlet;
a first pressure section of heat exchangers intermediate the gas inlet and the gas outlet;
a second pressure section of heat exchangers intermediate the first pressure section and the gas outlet, wherein the pressure within heat exchangers of the first section is greater than the pressure within the heat exchangers of the second section;
a sorbent injection grid intermediate an economizer and an evaporator of the heat recovery steam generator, and having a plurality of injection ports configured to inject a sorbent into the flow of exhaust gas, the sorbent is configured to react with an acid gas within the flow of exhaust gas to neutralize the acid gas and inhibit the formation of salt deposits;
a first catalyst intermediate the first pressure section and the sorbent injection grid to convert carbon monoxide (CO) to carbon dioxide ($CO_2$);
an ammonia injection grid intermediate the sorbent injection grid and the second pressure section, the ammonia injection grid being configured to inject ammonia into the flow of exhaust gas; and
a second catalyst intermediate the ammonia injection grid and the second pressure section to convert nitrogen oxides into nitrogen and water.

11. The heat recovery steam generator of claim 10, wherein the first pressure section is a high pressure section and the second pressure section is a low pressure section.

12. The heat recovery steam generator of claim 10, wherein the first pressure section is a high pressure section and the second pressure section is an intermediate pressure section.

13. The heat recovery steam generator of claim 10, wherein:
the sorbent is a solid sorbent.

14. The heat recovery steam generator of claim 13, wherein:
a flow velocity of the exhaust gas at the sorbent injection device is between approximately 2 m/s and 6 m/s.

15. The heat recovery steam generator of claim 13, wherein:
the sorbent is trona having a particle size between approximately 10 µm and 35 µm.

16. The heat recovery steam generator of claim 13, wherein:
the sorbent is hydrated lime having a particle size between approximately 2 µm and 4 µm.

17. The heat recovery steam generator of claim 13, wherein:
the sorbent is sodium bicarbonate having a particle size between approximately 10 µm and 20 µm.

18. The heat recovery steam generator of claim 13, wherein:
the sorbent is magnesium oxide having, a particle size between approximately 0.5 µm and 2 µm.

19. The heat recovery steam generator of claim 10, wherein:
the acid gas includes sulfur oxides.

* * * * *